(12) United States Patent
Oerke et al.

(10) Patent No.: US 8,091,956 B2
(45) Date of Patent: Jan. 10, 2012

(54) APPARATUS FOR SEALING AND DAMPING

(75) Inventors: Philipp Oerke, Munich (DE); Dennis Nolles, Munich (DE)

(73) Assignee: Webasto AG, Stockdorf (DE)

( * ) Notice: Subject to any disclaimer, the term of this patent is extended or adjusted under 35 U.S.C. 154(b) by 752 days.

(21) Appl. No.: 11/912,987

(22) PCT Filed: Apr. 25, 2006

(86) PCT No.: PCT/DE2006/000731
§ 371 (c)(1),
(2), (4) Date: Jun. 23, 2008

(87) PCT Pub. No.: WO2006/116970
PCT Pub. Date: Nov. 9, 2006

(65) Prior Publication Data
US 2009/0211164 A1    Aug. 27, 2009

(30) Foreign Application Priority Data

Apr. 29, 2005    (DE) ................. 20 2005 006 878 U

(51) Int. Cl.
*B60J 7/00* (2006.01)
*E06B 7/16* (2006.01)

(52) U.S. Cl. .................. 296/216.06; 49/490.1; 49/495.1

(58) Field of Classification Search .............. 49/490.1, 49/495.1; 296/214, 146.9, 216.06, 216.07
See application file for complete search history.

(56) References Cited

U.S. PATENT DOCUMENTS

| | | | | |
|---|---|---|---|---|
| 4,993,775 | A * | 2/1991 | Keys | 296/201 |
| 5,791,722 | A * | 8/1998 | Nozaki et al. | 296/146.9 |
| 5,964,496 | A * | 10/1999 | Nozaki et al. | 296/146.9 |
| 6,138,338 | A | 10/2000 | Berry et al. | |
| 6,186,586 | B1 * | 2/2001 | Lindinger | 296/214 |
| 6,435,597 | B1 * | 8/2002 | Anders et al. | 296/107.07 |
| 2005/0001458 | A1 | 1/2005 | Yamada | |

FOREIGN PATENT DOCUMENTS

| | | |
|---|---|---|
| DE | 3921381 | 1/1991 |
| DE | 4018745 | 1/1991 |
| DE | 10246753 | 4/2004 |
| EP | 0976596 | 2/2000 |
| EP | 1063113 | 12/2000 |
| EP | 1378388 | 1/2004 |
| JP | 8-34240 | * 2/1996 |
| JP | 2006-264354 | * 10/2006 |

* cited by examiner

*Primary Examiner* — Dennis Pedder
(74) *Attorney, Agent, or Firm* — Fitch Even Tabin & Flannery; John M. Naber

(57) ABSTRACT

Sealing and attenuating device (1) with a fastening device 2 to attach the device (1) to a first component and a sealing mechanism 3 to seal off the first component from a second component, and an attenuating device (4) to attenuate the impact of a third component against the first component.

6 Claims, 3 Drawing Sheets

APPARATUS FOR SEALING AND DAMPING

This application is a 35 U.S.C. §371 National Stage entry of PCT/DE2006/000731, filed Apr. 25, 2006, which claims priority from German patent application No.: DE 20 2005 006 878.0, filed Apr. 29, 2005, the contents of which are herein incorporated by reference.

The device relates to a sealing and attenuating device.

A known procedure consists in equipping openings in motor vehicles, in particular those which are closed by means of doors, windows or sliding roofs, with seals in such manner that on the one hand no water penetrates into the interior and on the other hand, noise is kept out as much as possible from the vehicle interior.

Conventional seals consist e.g. of a hard area with a slip-on area by means of which the seal can be slipped on a body groove, as well as of a soft area made in particular in form of a full-profile cellular-rubber seal or hollow-profile seal with a sealing chamber.

DE 101 51 481 A1 discloses a seal with a hollow chamber, whereby the hollow chamber is provided with a series of parallel grooves on the inside. The grooves are designed in such manner that the sound waves entering the hollow chamber are to be attenuated through multiple reflections. In addition to this function, this seal should absorb energy when the hollow chamber is compressed, and in particular when a door is slammed shut. For this purpose the seal is provided with at least two elastic ridges and/or projections across from each other which rub against each other and/or deform each other when the hollow chamber is compressed. In addition to the sealing effect of the seal which is effective in the direction of movement of the elements to be sealed, attenuation should thereby also take place in the direction of movement of the two elements to be sealed. The direction of attenuation and the direction of sealing coincide in this case.

U.S. Pat. No. 6,099,068 discloses a sealing arrangement to establish a seal between a door frame of a motor vehicle door and the body groove surrounding the door opening. In order to improve the sealing action and in particular in order to absorb the door impact and to produce a greater restoring force, the seal profile is changed in such manner that instead of one single hollow-profile, a hollow-profile pointing towards the door frame and an additional hollow chamber between this hollow-profile and the sealing body are provided. Thus one single hollow-profile chamber is practically subdivided into two hollow-profile chambers. The sealing effect and the attenuating effect act in the same direction also with this sealing arrangement.

JP 11157340 A discloses a seal with sound insulating function. For this purpose a sealing arrangement with a basic body is provided at a vehicle door, with a hollow sealing profile on the one hand and a protruding lip on the other hand, the latter in contact with the outside of a vehicle body. The lip is made of a cellular rubber, whereby the lip has an elongated core of a harder material that bridges the sealing gap and should produce improved sound insulation by means of the selected material. With this seal no attenuation of impact is provided.

It is furthermore generally known that when a moving component impacts a fixed component, in particular in the case of motor vehicles, attenuating stops are necessary. For this purpose separate components such as attenuating elements, buffers, felts, etc. are used according to the state of the art. Especially with manually actuated sun protection systems (window blind, sliding roof, etc.) a stop is required for the "open" as well as for the "closed" position, and is installed in the guide rail (rubber buffer, etc.) or on the sun protection system, e.g. at the window shade bar or on the sliding roof, in form of a rubber buffer, hollow-chamber seal, etc. Partially separate stop bumpers are installed on the underside especially with wind deflectors, in order to avoid impacts within the wind deflection box.

It is a disadvantage in this case that additional components and additional assembly steps are required. Furthermore a logistic effort (supply of materials, management of drawings, etc.) is required and represents a share of costs that is not negligible.

It is the object of the present invention to reduce the number of components and to accelerate and simplify assembly and to reduce the logistics expenditures.

This object is attained in that the sealing function and the attenuating function are merged in one single attenuating and sealing device, whereby an already provided or existing sealing device needed for another function is in addition designed as an attenuating stop for a moving system.

Thereby the device comprises two mechanisms for different functions and for the interaction with different components, i.e. with a sealing device to seal a gap between the component supporting the device and an additional component, as well as an attenuating device to attenuate the impact of a third component upon the component bearing the device.

Attenuation can here be effected advantageously by a hollow-chamber profile, a full cellular rubber profile or a lip which is attached by a tapered zone to the device and can be partially removed. The sealing mechanism on such a device can be a so-called top seal, a water gutter seal, an acoustic seal on a frame element in front or in the rear, or also a seal on a wind deflector. The sealing mechanism and the attenuating mechanism can be designed independently of each other, so that the most varied sealing or attenuating profiles can be combined with each other. Notably the working direction of the seal and the working direction of the attenuation do not coincide. The device is e.g. provided with a fastening device to attach the device to a first component which supports the device. This fastening device is e.g. a known fastening device made of an elastic synthetic material with an insertion slit and a support, e.g. made of metal, imbedded in the synthetic material and surrounding the insertion slit. The fastening device thus has three lateral walls oriented to the outside, whereby the sealing device, e.g. a hollow-chamber profile is attached on a lateral wall in one direction and the attenuating device, e.g. also a hollow-chamber profile is attached to one of the other sides.

It is an advantage with the invention that a device according to the invention causes the number of assembly steps to be reduced thanks to a reduction of components. Thereby a cost reduction is possible. Furthermore the design of the seal and of the attenuation in one piece also makes a reduction of construction space possible.

The invention is explained through a drawing in which.

Figure 1:
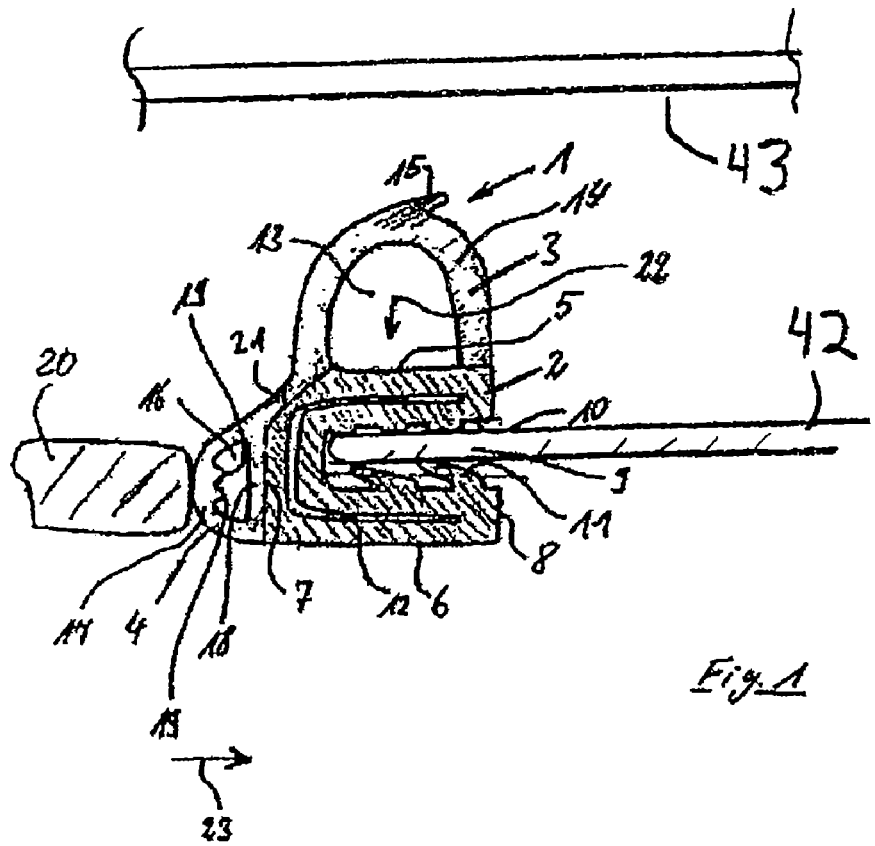
FIG. 1 shows a first embodiment of the sealing and attenuating device according to the invention in cross section, whereby the attenuating mechanism and the sealing mechanism are each designed in form of a hollow-chamber profile.

A device 1 according to the invention is provided with a fastening device 2, a sealing mechanism 3 and an attenuating mechanism 4.

The fastening device 2 is designed e.g. with a box shape in cross-section, with two broad sides 5 and 6 across from each other and two narrow lateral walls 7, 8 across from each other, whereby an insertion slit 9 coming from a narrow lateral wall 8 is provided in the fastening device 2. An interior wall 10 is made in form of a contour and has e.g. elements 11 that are hook-shaped in cross-section in order to ensure adherence of the fastening device 2 to a body groove first component 42 (not chown). The width of the slit 9 is in this case approximately equal to the width of a body groove 42 or is slightly narrower. Between the interior wall 10 and the lateral walls 6, 7 a support 12 is formed in a known manner within the material constituting the fastening device 2. The support 12 extends preferably over the length of the fastening device 2 and serves as a form stabilizer of the fastening device 2 and in particular to ensure secure support of the fastening device 2 on a car body flange or car body groove.

The fastening device 2 is made in a known manner of a hard elastic synthetic material, in particular a hard rubber material.

Along the wide side wall 5 of the fastening device 2 a hollow profile is formed as a sealing mechanism 3. The sealing mechanism 3 has a hollow-profile chamber 13 and a sealing wall 14 delimiting the hollow-profile chamber 13. The sealing wall 24 is designed in particular in form of a dome or cupola, whereby an additional sealing lip 15 is provided in the area of the apex. The sealing wall 14 is made of a soft elastic synthetic material and in particular of a soft elastic rubber and is attached alongside the wide side wall 5 of the fastening device 2 to the latter, e.g. by vulcanizing.

The attenuating mechanism 4 is installed alongside a narrow lateral wall 7 which extends essentially at a right angle to the wide side wall 5. The attenuating mechanism 4 is made in form of a hollow profile and is provided with a hollow chamber 16 delimited to the outside by means of an attenuating wall 17. Adjoining to the lateral wall 7, the attenuating mechanism 4 is provided with a bottom wall 18 made in one piece with the attenuating wall 17. The attenuating wall 17 and the bottom wall 18 are made e.g. of a soft elastic synthetic material, in particular a soft elastic rubber material, whereby the attenuating mechanism 4 is attached together with the bottom wall 18 alongside the lateral wall 7 and to the latter, e.g. by means of vulcanizing.

The attenuating wall 17 is also designed flat and cupola-shaped or dome-shaped and is provided with attenuating lips or attenuating strips 19, in particular two adjoining attenuating strips 19, on the inside in the apex area. When the attenuating wall 17 is equipped from the outside, e.g. with a shade bar 20, the attenuating strips 19 are moved towards the bottom wall 18 and, through contact with the bottom wall 18 and deformation, further attenuate the impact of the shade bar 20 against the attenuating wall 17. The sealing wall 14 and the attenuating wall 17 or the bottom wall 18 can be connected to each other via a connecting segment 21 alongside the fastening device 2. This makes it possible to extrude the two mechanisms 3, 4 together.

Alternatively, the sealing mechanism 3 and/or the attenuating mechanism 4 can be constituted by full profiles or, in particular, full cellular-rubber profiles instead of hollow profiles. In another advantageous embodiment the sealing wall 14 and the attenuating wall 17 are made of a dense, elastic synthetic material, in particular a rubber. The hollow chambers 13, 16 are filled with a soft elastic foamed synthetic material, e.g. a cellular rubber material.

In order to achieve sealing, i.e. so that the sealing wall 14 is in intimate contact with a second component 43, the sealing mechanism 3 is deformed along a working direction (arrow 22) and presses, in particular with the sealing lip 15, sealingly against a second component 43 thanks to elasticity or elastic restoring force.

In order to achieve an attenuating effect, in particular to attenuate the impact of a shade bar 20 impacting a component on which the device 1 is attached through the insertion slit 9, the attenuating wall 17 is deformed in direction of the bottom wall 18 or of the lateral wall 7 along a working direction (arrow 23). The working directions 22, 23 are approximately perpendicular relative to each other.

Figure 2:
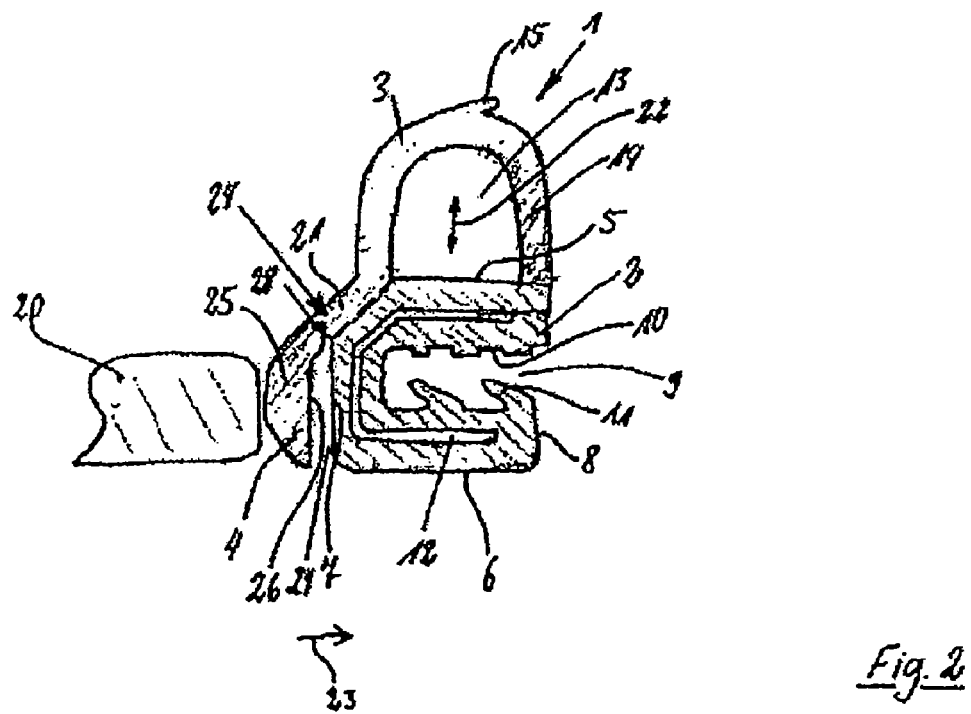
FIG. 2 shows another embodiment of the sealing and attenuating device in cross-section, whereby the attenuating mechanism is made in form of a hollow-chamber profile and the attenuating mechanism in form of an attenuating lip.

In another advantageous embodiment (FIG. 2) the attenuating mechanism 4 is not made in form of a hollow profile, whereby otherwise identical parts are given identical reference numbers. In this embodiment the attenuating mechanism 4 is attached in a tab-like manner within an attachment area 24 of the lateral wall 7 of the fastening device 2 or in the area of the connecting segment 21, between the sealing mechanism 3 and the attenuating mechanism 4. In this case the attenuating mechanism 4 is made in form of an attenuating lip or attenuating bead 25. The attenuating bead 25 is placed a gap 27 away from the lateral wall 7. Due to the elasticity in the lateral edges or attachment area 24 the gap 27 exists when the attenuating bead 25 is not under load. In case of load, e.g. by a shade bar 20, a bottom wall 26 of the attenuating bead 25 is moved towards the lateral wall 7 in the vicinity of the attachment zone 24 along the working direction 23, against the elastic restoration forces of the material. Upon impact of the bottom wall 26 against the lateral wall 7, attenuation takes place as a result of the elastic deformation of the attenuating bead 25.

A target point of break 28 in form of a tapering of material in the attachment zone 24 is advantageously located in the area of the bottom of gap 27 or in the attachment zone 24. This makes it possible to notch the attenuating bead 25 in areas in which it is not wanted and to tear it off from the fastening device 2. It is thereby possible to provide attenuating beads 25 as limit stop elements for a shade bar 20 only at the outer ends of the shade bar 20. The attenuating bead 25 can be made of a somewhat harder, denser elastic synthetic material such as a rubber, as well as of a foamed synthetic material, in particular cellular rubber.

Figure 3:
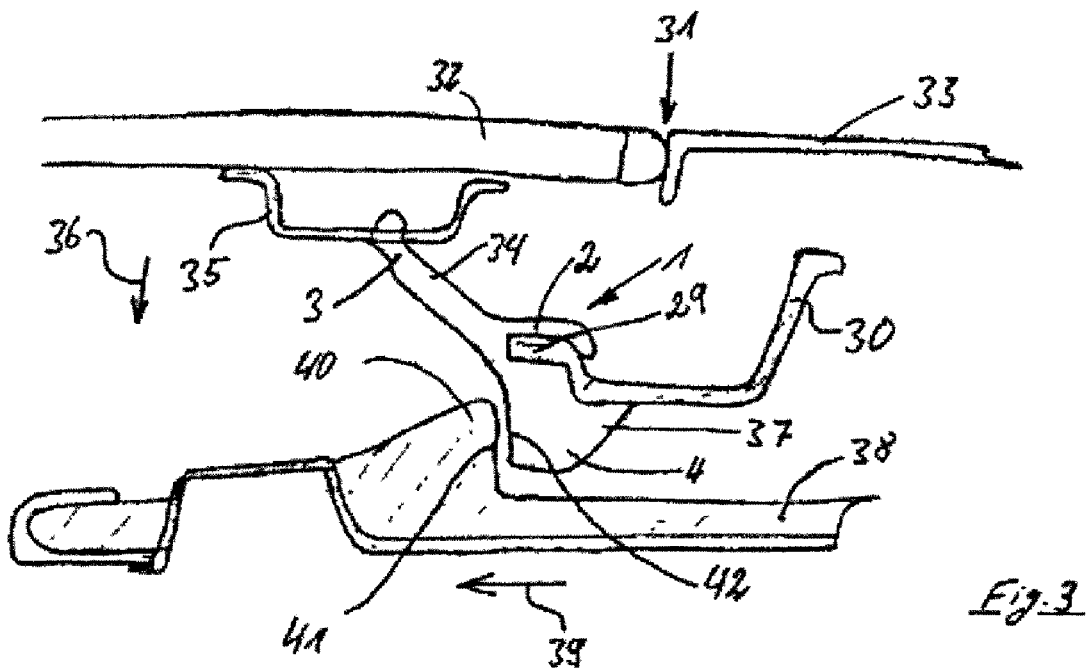
FIG. 3 shows another embodiment of the sealing and attenuating device in cross-section, whereby the sealing mechanism is in form of a sealing lip and the attenuating mechanism is in form of an attenuating bead.

In another advantageous embodiment (FIG. 3) the sealing and attenuating device 1 is located in the area of a water gutter 30 of a sliding roof. The device 1 is provided with the fastening device 2, the sealing mechanism 3 and the attenuating mechanism 4. The fastening device 2, the sealing mechanism 3 as well as the attenuating mechanism 4 are made in one piece in this case, whereby the fastening device 2 is pushed across a longitudinal edge 29 of a water gutter 30. The water gutter 30 is located in this case for example below an impact zone 31 between a glass roof 32 and a roof skin 33 of a motor vehicle. The water gutter 30 extends here below the impact zone 31 over the length of the impact zone 31 in order to catch and divert water penetrating the impact zone 31.

The sealing mechanism 3 in form of a sealing lip 34 or a sealing strip 34 protrudes from the fastening device 2 in direction of the glass roof 32. Underneath the glass roof 32, a strip 35 is provided and protrudes downward over the glass roof 32, interacting sealingly with the sealing strip 34 or the sealing lip 34 when the glass roof is closed. The strip 35 of the glass roof 32 bends in that case the sealing lip 34 along the working direction (arrow 36) of the sealing lip 34, so that the sealing lip 34 presses under pressure and thereby sealingly against an underside of the strip 35.

Protruding downward across the water gutter 30, the attenuating mechanism 4 extends away from the fastening device 2. The attenuating mechanism 4 is in this case made in form of an attenuating strip 37 or attenuating bead 37. The attenuating bead 37 is used for example to attenuate the impact of a sliding roof lining 38 located under the water gutter 30 and under the glass roof 32. The sliding roof lining 38 is movable along a direction 39 (arrow 39) e.g. parallel to the sliding roof 32. The sliding roof lining 38 is provided with a limit stop 40 oriented towards the water gutter 30 or the attenuating bead 37. The limit stop 40 is provided with an impact surface 42 that interacts with an attenuating surface 42 of the attenuating bead 37. The impact surface 41 and the attenuating surface 42 are here at a right angle or inclined relative to the direction of movement 39. The direction of movement 39 of the sliding roof lining 38 is here also the same as the working direction of the attenuating bead 37. In this embodiment the working directions 36 or the compression direction 36 of the sealing mechanism 3 and the working direction or compression direction (arrow 34) of the attenuating mechanism 4 are thus essentially perpendicular relative to each other. This means that the working direction of the sealing mechanism 3 and the attenuating direction 4 do not coincide.

Figure 4:
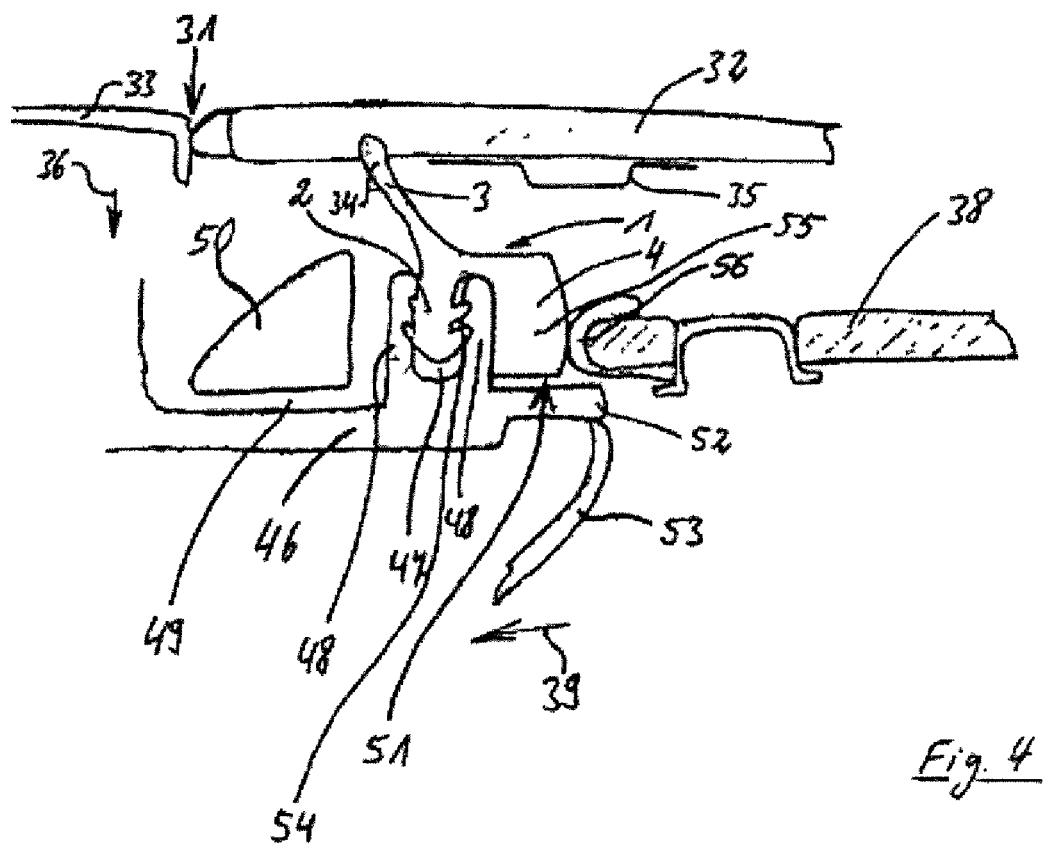
FIG. 4 shows another embodiment of the sealing and attenuating device in cross-section, whereby the sealing mechanism is designed as a sealing lip and the attenuating mechanism as a full profile.

In another embodiment (FIG. 4) the sealing and attenuating device 1 is installed on a forward frame element 46 of a sliding roof lining 38 in order to create an acoustic seal. For this purpose a receiving groove 47 extending with groove sides 48 in direction of a glass roof 32 is provided on the frame element 46. The receiving groove 47 adjoins a wind deflector 50 and/or a water gutter 49 located beneath the impact zone 31 between the glass roof 32 and a roof skin 33 of the motor vehicle. The water gutter 49 contains the wind deflector 50 which is installed so that once the glass roof 32 has been moved away from the impact zone 31, it can be moved at least partially upward and out of the opening covered by the glass roof 32 so that it thereby preferably closely adjoins or is in contact with the roof skin 33.

An impact zone 51 is provided for the sliding roof lining 38 across from the water gutter 49 in the area of a groove side 48. A bottom wall segment 52 of the frame element 46 to which a fixed vehicle roof lining 53 is fastened is located adjoining the groove side 48. The sealing and attenuating device 1 is provided with the fastening device 2 which is made in form of an attachment strip that can be plugged into the receiving groove 47, whereby profiles 54, e.g. lamellas or lips are provided in longitudinal areas of the fastening device 2.

Extending upward above the receiving groove 47 and in direction of the impact zone 31 extends the sealing mechanism 3 in form of a sealing strip 34 or a sealing lip 34 placed in such manner that when the glass roof 32 is closed, it is presses sealingly from below to the glass roof 32.

Regarding the receiving groove 47, the attenuating mechanism 4 is located on the fastening device 2 across from the sealing mechanism 3, whereby the attenuating mechanism 4 is an attenuating bead 55 extending across a groove side 48 into the impact zone 51, said attenuating bead 55 extending from an upper edge of the corresponding groove side 48 in the direction of the bottom wall 52 and, starting at the groove wall 48 against which it is pressed, extending in the direction of a forward impact edge 56 of the sliding roof lining 38. The sliding roof lining 38 thus contacts the attenuating bead 55 with its forward, closing impact edge 56.

When the glass roof 32 is closed by sliding, the sealing lips 34 of the sealing mechanism 3 is displaced or bent in the direction of arrow 36, essentially in a vertical direction, so that essentially a vertical working device 36 exists. The attenuating bead 55 attenuates the impact in the direction of movement 39 of the sliding roof lining 38 which extends essentially horizontally, so that in this embodiment too, the working directions 36 and 39 do not coincide. Just as in other embodiments, the attenuating bead 55 can in this case be made of a full cellular rubber material or of comparable materials or as a hollow profile or as attenuating bead. The sealing lip 34 can also point up and away from the receiving groove in form of a hollow profile or as full profile and be made of the suitable materials.

Figure 5:
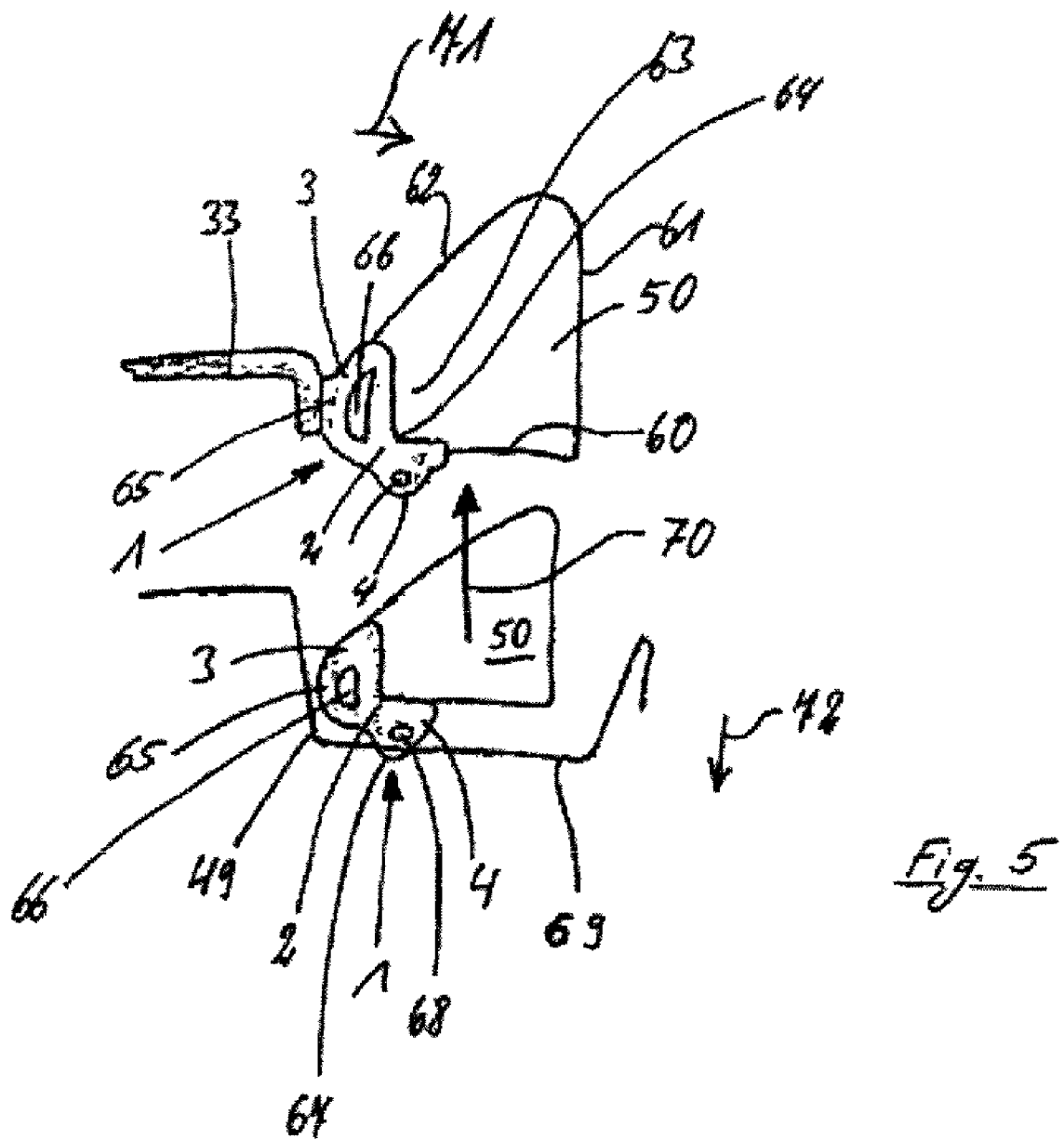
FIG. 5 shows an additional embodiment of the sealing and attenuating device according to the invention in cross-section with a wind deflector as insert.

In another advantageous embodiment (FIG. 5) in which the same parts are given the same reference numbers, the sealing and attenuating device 1 is installed on the wind deflector 50.

The wind deflector 50 is e.g. essentially triangular in its cross-section and is a strip extending over the width of a roof opening, whereby this strip is provided with a base 60, a lateral rear wall 61 extending vertically upward and an inclined deflecting surface 62 connecting the vertical lateral rear wall 61 and the horizontal base 60 and pointing into the wind of travel. In a zone 63 in which the deflecting surface 62 and the horizontal base 60 meet, the wind deflector 50 is designed for example in such manner that the deflecting surface 62 first rises vertically from the horizontal base 60 and then evolves into the inclined deflecting surface 62. Thereby a rectangularly enclosed lower forward edge 64 is formed. The sealing and attenuating device 1 is installed adjoining the base 60 in the area of the lower forward edge 64.

The sealing and attenuating device 1 is provided in the area of the forward, lower edge 64 with the fastening device 2 which is designed to follow the course of the edge 64. Projecting from the fastening device 2 is the sealing mechanism 3. The sealing mechanism 3 is a hollow profile with a projecting sealing wall 65 as well as with a hollow chamber 66. Underneath the base 60 is the attenuating mechanism 4 which points down. The attenuating mechanism 4 is also designed in form of a hollow profile with an attenuating wall 67 and has a chamber 68 that is delimited by the attenuating wall 67 and the fastening device 2. To attach it to the wind deflector 50, the sealing and attenuating device 1 is e.g. bonded to the wind deflector 50.

When the sliding roof (not shown) is closed, the wind deflector 50 is located in the water gutter 49 together with the attenuating mechanism 4 or the attenuating wall 67 laid on a bottom 69 of the water gutter 49. When a sliding roof such as e.g. a sliding glass roof is opened, the wind deflector 50 is moved up out of the water gutter 49 in the direction of arrow 70 by means of a suitable device (not shown) until the sealing wall 65 pushes in front against the roof skin 33. In this process the sealing mechanism 3 is deformed in the direction of arrow 71. This is identical with the working direction of the sealing mechanism 3. When the wind deflector 50 is again retracted as the roof is closed, it impacts the attenuating mechanism 4 on the bottom of the water gutter 49. The working direction of the attenuating mechanism 4 is thus approximately identical with the direction of arrow 72. Thus in this embodiment too, the working direction of the sealing mechanism 3 (arrow direction 71) and that of the attenuating mechanism 4 (arrow direction 72) thus do not coincide. The attenuating mechanism 4 and the sealing mechanism 3 can of course also be made in form of full cellular-rubber profiles or similar synthetic material in this embodiment.

In the invention it is an advantage that a sealing function and an attenuating function are ensured by means of one single component, while a reduction of construction space can also be achieved with a suitable adaptation of the design of the moving parts.

The attenuating mechanism 4 may extend in this case e.g. over the entire length of the sealing mechanism 3 and of the fastening device 2. Thereby the devices can be produced advantageously together, e.g. by extrusion in form of an extrusion string and can be suitably cut to size and be installed on the fastening device 2. Of course the fastening device 2 can also be designed and produced in one piece with the sealing mechanism 3 and the attenuating mechanism 4.

In addition it is possible to install the attenuating mechanism 4 at certain locations only, preferably at the outer ends of the fastening device 2 and/or of the sealing mechanism 3. For this purpose the attenuating mechanism 4 can be designed in particular as a lip with an attenuating bead attached to the fastening device 2 by a target point of break so that the attenuating mechanism 4 can easily be broken off from area to area.

As described, the fastening device 2 can be a separate component, but it can also be combined in one piece with the sealing mechanism 3 and the attenuating mechanism 4. In the simplest case the fastening device 2 can connect the sealing mechanism 3 and the attenuating mechanism 4 with each other, e.g. in the manner of an angle section.

All the embodiments of the invention have in common that the working directions, i.e. the directions of compression of the sealing mechanism 3 and of the attenuating mechanism 4 do not coincide. The direction of compression of the attenuating mechanism 4 and of the sealing mechanism 3 may for example be at a right angle relative to each other. However they may also enclose an angle of 180°, i.e. they can be located in one and the same plane, but with opposite orientation.

The invention is not limited to the field of sliding roofs. Doors and windows as well as the trunk area can also be reasonable areas of application. A hinged hat rack could for instance be installed on the tailboard, on an attenuating device of the tailboard window seal. Furthermore the stop of a sunshade blind at the vehicle sides or rear window can also press against or adjoin a device according to the invention.

The invention claimed is:

1. A sealing and attenuating assembly comprising:
    a fastening device configured for the attachment of a sealing component and an attenuating component to a first component, the fastening comprising a top exterior surface, a first side wall and an interior surface opposite the first side wall, the interior surface configured to define an opening for receiving an end region the first component;
    a tubular seal spanning the top wall to form a seal between the first component and a second component; and
    an attenuating device attached to the first side wall of the fastening device and having two spaced layers wherein at least one of the layers is movable toward the other layer to attenuate the impact of a third component against the first component in a direction substantially parallel to the end region;
    wherein the sealing device and the attenuating device are formed as a single, integral piece.

2. The device of claim 1, wherein the attenuating device and sealing device are configured so that a working direction of the sealing device and a working direction of the attenuating device are perpendicular to each other.

3. The device of claim 1, characterized in that the sealing device made of at least one of:
    an elastic synthetic material,
    a hollow-chamber profile,
    a full profile made of an elastic synthetic material, and
    a lip made of an elastic synthetic material.

4. The device of claim 1, characterized in that the attenuating device is designed over the entire length of the attenuating and sealing device to constitute one single attenuating device.

5. The device of claim 1, wherein the attenuating device is made of at least one of:
    an elastic synthetic material,
    a hollow-chamber profile,
    a full profile made of an elastic synthetic material, and
    a lip made of an elastic synthetic material.

6. The device of claim 1, wherein the attenuating device is designed over partial lengths of the attenuating and sealing device to constitute several attenuating devices.

* * * * *